United States Patent
Onoyama et al.

(10) Patent No.: US 6,865,451 B2
(45) Date of Patent: Mar. 8, 2005

(54) ENGINE CONTROL FOR VEHICLE USING ELECTRONIC KEY SYSTEM

(75) Inventors: Taiichi Onoyama, Yokohama (JP); Takayuki Ujifusa, Ebina (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/691,557

(22) Filed: Oct. 24, 2003

(65) Prior Publication Data

US 2004/0093127 A1 May 13, 2004

(30) Foreign Application Priority Data

Oct. 28, 2002 (JP) ........................................ 2002-312410

(51) Int. Cl.[7] ................................................. G06F 7/00
(52) U.S. Cl. ............................ 701/2; 701/36; 701/112; 123/179.2
(58) Field of Search .......................... 701/1, 2, 36, 112; 123/179.2–179.4; 280/165, 65.2–65.4

(56) References Cited

U.S. PATENT DOCUMENTS 5,865,263 A * 2/1999 Yamaguchi et al. ....... 180/65.2
6,019,183 A * 2/2000 Shimasaki et al. .......... 180/165
6,782,704 B2 * 8/2004 Kuroda et al. ................ 62/133
6,793,059 B2 * 9/2004 Okada et al. ............... 192/84.1
6,802,291 B2 * 10/2004 Ujifusa ..................... 123/179.4
2002/0107632 A1    8/2002 Fuse et al.

FOREIGN PATENT DOCUMENTS

GB          2 044 845 A      10/1980

* cited by examiner

Primary Examiner—Richard M. Camby
(74) Attorney, Agent, or Firm—Foley & Lardner LLP

(57) ABSTRACT

An engine (1) of a vehicle comprises an identification device (11) which verifies the identification code of an electronic key (12) using a wireless signal. The controller (5) executes an idle stop under predetermined stop conditions (S6, S7) and re-starts the engine (1) during the idle stop when any one of a plurality of restart conditions are satisfied. The restart conditions include a restart request from the driver of the vehicle (S6, S7). The controller (7) commands the identification device (11) to verify the identification code of the electronic key (12) when restart conditions are established which do not correspond to the restart request to the engine (1) of the driver during an idle stop. When the verification is unsuccessful, restarting of the engine (1) is prohibited and thus it is possible to prevent restarting the engine (1) when the driver is not present.

12 Claims, 4 Drawing Sheets

ENGINE CONTROL FOR VEHICLE USING ELECTRONIC KEY SYSTEM

FIELD OF THE INVENTION

This invention relates to startup control for a vehicle engine having an idle stop function and an electronic key system.

BACKGROUND OF THE INVENTION

Instead of an ignition switch for a mechanical key used in a conventional vehicle, recent vehicle models use an electronic key system permitting engine startup by verifying an identification code stored in a computer mounted in the vehicle against an identification code recorded in an electronic key. The verification operation of the identification code in the electronic key and the computer is automatically performed by a wireless signal as a result of a driver being in proximity to the vehicle holding the electronic key.

After the driver stops the engine, alights from the vehicle and locks the door, engine startup is prohibited until the driver returns to the proximity of the vehicle and re-verifies the identification code.

SUMMARY OF THE INVENTION

The inventors have discovered that the problem described below occurs when the above electronic key system is combined with an engine having an idle stop function. An idle stop function is a function which automatically stops engine operation when a predetermined idle state continues for a predetermined time. After the engine is stopped by the idle stop function, when battery charging is necessary for example, the engine is restarted automatically.

Let us assume a situation in which the driver has left the vehicle without locking the door and when engine operation has been stopped by the idle stop function. In this situation, if battery charging is required when the driver is not present, the engine will be automatically started. However it is not preferred for the engine to be started while the driver is not present and is not aware of the fact.

It is therefore an object of this invention to prevent a vehicle engine from restarting after it is stopped by the idle stop function, when the driver is not inside or in the vicinity of the vehicle.

In order to achieve the above object, this invention provides a control device for such an engine of a vehicle that comprises an operating device which operates the engine under an electronic key system comprising a portable electronic key which emits an identification code, and an identification device mounted in the vehicle to verify the identification code of the electronic key.

The control device comprises a programmable controller programmed to control the operating device to execute an idle stop which stops the engine under a predetermined stop condition, and control the operating device to restart the engine during the idle stop when any of a plurality of restart conditions are satisfied. The restart conditions are including a restart request from a driver of the vehicle. The controller is further programmed to determine whether or not the engine is in the idle stop, determine whether or not a restart condition is satisfied which does not correspond to a restart request from the driver during an idle stop, control the identification device to verify the identification code of the electronic key when a restart condition is satisfied which does not correspond to the restart request from the driver during the idle stop, and prohibit the operating device from restarting the engine when the identification device has failed in verifying the identification code.

This invention also provides a control method for the engine described above. The control method comprises controlling the operating device to execute an idle stop which stops the engine under a predetermined stop condition, and controlling the operating device to restart the engine during the idle stop when any of a plurality of restart conditions are satisfied. The restart conditions are including a restart request from a driver of the vehicle. The method further comprises determining whether or not the engine is in the idle stop, determining whether or not a restart condition is satisfied which does not correspond to a restart request from the driver during an idle stop, which does not correspond to the restart request from the driver during the idle stop, and prohibiting the operating device from restarting the engine when the identification device has failed in verifying the identification code.

The details as well as other features and advantages of this invention are set forth in the remainder of the specification and are shown in the accompanying drawings.

DESCRIPTION OF THE PREFERRED EMBODIMENTS

Figure 1:
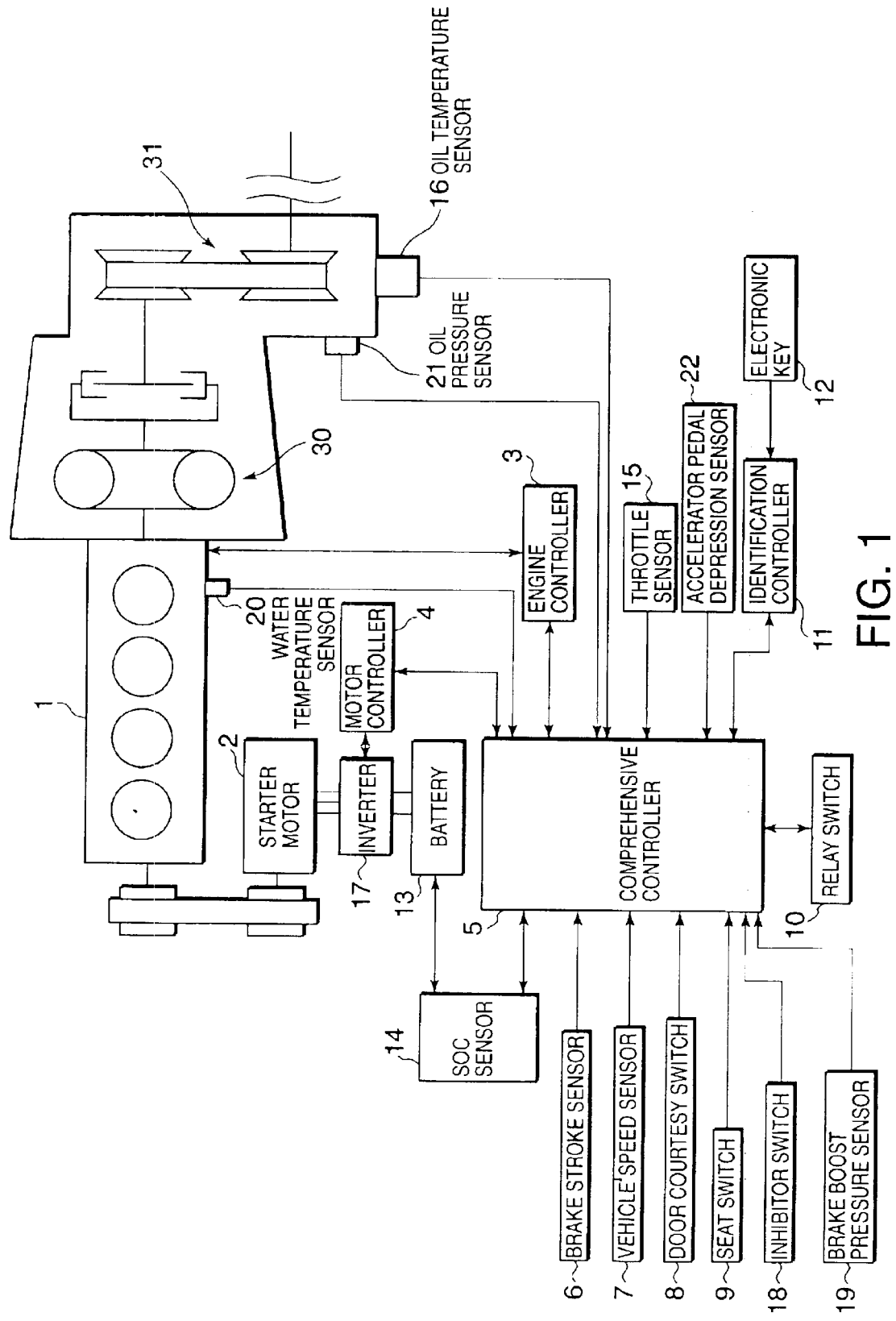
FIG. 1 is a schematic diagram of a drive mechanism for a vehicle according to this invention.

Referring to FIG. 1 of the drawings, an internal combustion engine 1 for a vehicle drives the vehicle through a power train comprising a torque converter 30 and a continuously variable transmission 31. The engine 1 is connected to a starter motor 2 by a belt and is started by operating the starter motor 2.

Engine operation, specifically ignition and injection of fuel to the engine 1 is controlled by an engine controller 3.

The starter motor 2 is connected to a battery 13 by an inverter 17. The operation of the starter motor 2 is controlled by a motor controller 4 via the inverter 17. The vehicle further comprises an identification controller 11 which verifies an identification code using an electronic key 12 held by the driver.

The engine controller 3, the motor controller 4 and the identification controller 11 are respectively connected with the comprehensive controller 5 by a signal circuit. The comprehensive controller 5 is respectively connected by a signal circuit with the following components. A brake stroke sensor 6 detects the operation of the brake pedal of the vehicle. A vehicle speed sensor 7 detects a vehicle speed. A door courtesy switch 8 detects the opening and closing of the vehicle doors and the bonnet. A seat switch 9 detects the state of the driver's seat in order to determine whether or not a person is seated in the driver's seat. A relay switch 10 supplies power from the battery to engine accessories. A SOC sensor detects the state of charge (SOC) of the battery 13. A throttle sensor 15 detects the opening of the throttle in the engine 1. An oil temperature sensor 16 detects an oil temperature of the continuously variable transmission 31. An inhibitor switch 18 detects the selected range of a shift lever in the vehicle. A brake booster switch 18 detects the boosting pressure of the vehicle brake. A water temperature sensor 20 detects the temperature of cooling water in the engine 1. An oil pressure sensor 21 detects the oil pressure of the continuously variable transmission. An accelerator pedal depression sensor 22 detects the amount of depression of the vehicle accelerator pedal.

The engine controller 3, the motor controller 4, the identification controller 11 and the comprehensive controller 5 comprise a microcomputer provided with a central processing unit (CPU), a read-only memory (ROM), a random access memory (RAM) and an input/output interface (I/O interface). A section or the whole of the above controllers may be constituted by a single microcomputer. Conversely any one of the above controllers, for example the comprehensive controller 5 may be constituted by a plurality of microcomputers.

The comprehensive controller 5 uses signals input from the above sensors or switches in order to execute idle stop control by automatically restarting and automatically stopping the engine 1 when the vehicle is stopped.

However when the engine 1 has been stopped by the idle stop function and is restarted without a request from the driver, the identification code of the electronic key 12 is verified. When there is not a matching code, in other words, when the verification of the identification code is not successful, restarting of the engine 1 is suspended.

Figure 2:
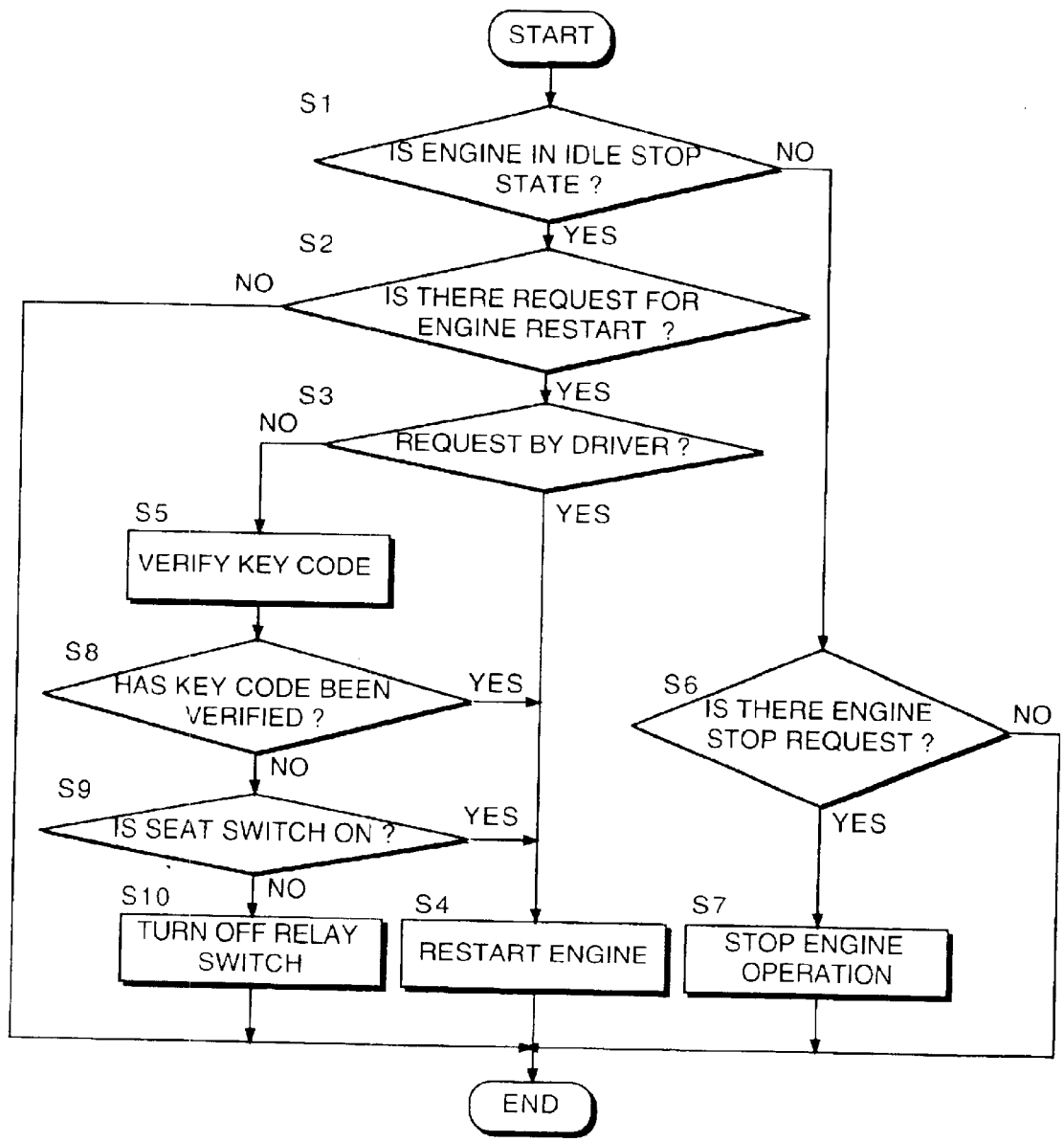
FIG. 2 is a flowchart showing an idle stop control routine executed by a comprehensive controller according to this invention.

Referring next to FIG. 2, an idle stop control routine executed by the comprehensive controller 5 to realize the above control will be described. This routine is executed at a ten-millisecond interval when the engine 1 is operating or during idle stop.

Firstly in a step S1, the comprehensive controller 5 determines whether or not the vehicle is in idle stop state. An idle stop is defined as a state in which the engine 1 is stopped based on predetermined operating condition rather than being based on a request from the driver. The predetermined operating condition will be described later. When the vehicle is in an idle stop, the routine proceeds to a step S2.

In the step S2, the comprehensive controller 5 confirms whether or not there is a request to start the engine 1. A request to start the engine 1 will be described below.

When the range signal from the inhibitor switch 18 shows a running range, it is determined that there is a startup request, if and any of the conditions (1)–(6) are satisfied while the signal from the door courtesy switch 8 shows that the doors and the bonnet are closed.

(1) The vehicle accelerator pedal is depressed.

(2) The brake is released.

(3) The battery SOC is less than a predetermined amount.

(4) The negative pressure (absolute value) of the brake booster is less than a predetermined value.

(5) The engine cooling water temperature is less than a predetermined temperature.

(6) The oil temperature of the continuously variable transmission is less than a predetermined temperature.

The depression of the accelerator pedal is determined based on a signal from the accelerator pedal depression sensor 22. The release of the brake can be determined from the stroke amount of the brake pedal detected by the brake stroke sensor 6. Alternatively, it is possible to detect the release of the brake when the pressure of the brake liquid is less than a predetermined pressure. The SOC of the battery 13 is determined based on a signal from the SOC sensor 14. The negative pressure of the brake booster is determined based on a signal from the brake booster pressure sensor 19. The engine cooling water temperature is determined based on a signal from the water temperature sensor 20. The oil temperature of the continuously variable transmission is determined based on a signal from the oil temperature sensor 16.

When the range signal of the inhibitor switch 18 shows a non-running range, specifically when it is in the parking range or the neutral range, it is determined that there is a startup request for the engine 1 when any one of the conditions (3)–(6) above are satisfied.

When the comprehensive controller 5 determines that there is a startup request for the engine 1, the processing of the step S3 is performed. When it is determined that there is not a startup request for the engine 1, the routine is immediately terminated.

In the step S3, the comprehensive controller 5 determines whether or not the startup request for the engine 1 is a startup request from the driver. More precisely, when conditions (1) or (2) of the conditions (1)–(6) are satisfied, it is determined that the request is a startup request from the driver. When the other conditions (3)–(6) are satisfied, it is determined that the startup request is not a request from the driver.

When the startup request is a startup request from the driver, in a step S4, the comprehensive controller 5 restarts the engine 1. The restarting operation of the engine 1 is performed as described hereafter in detail.

Specifically, the comprehensive controller 5 outputs a restart permission signal to the engine controller 3 and the motor controller 4. When the restart permission signal is input to the motor controller 4, the starter motor 2 is operated via the inverter 17 and cranking of the engine 1 is performed. When the restart permission signal is input to the engine controller 3, the engine controller 3 commands the fuel injector and the spark plug in the engine 1 to generate and ignite a gaseous mixture in the engine 1. Consequently the engine 1 is started and continuous operation is enabled above a predetermined rotation speed. When the engine rotation speed is greater than or equal to the predetermined rotation speed, the motor controller 4 turns off the starter motor 2.

After the processing in the step S4, the comprehensive controller 5 terminates the routine. In contrast, when it is determined in the step S1 that the vehicle is not in the idle stop state, the comprehensive controller 5 performs the processing in a step S6.

In the step S6, the comprehensive controller 5 confirms whether the idle stop conditions of the engine 1 are satisfied. Idle stop conditions are described below.

When the range signal from the inhibitor switch 18 is in a running range, it is determined that idle stop conditions for the engine 1 are satisfied if all the conditions (11)–(15) are satisfied while the brake pedal is depressed, the vehicle speed is zero and all doors and the bonnet are closed.

(11) The battery SOC is greater than a predetermined amount.

(12) The brake booster negative pressure (absolute value) is greater than a predetermined value.

(13) The engine cooling water temperature is greater than a predetermined temperature.

(14) The oil temperature in the continuously variable transmission is greater than a predetermined temperature.

(15) The oil pressure in the continuously variable transmission is greater than a predetermined pressure.

The depression of the brake pedal is determined on the basis of a signal from the brake stroke sensor 6. The vehicle speed is determined on the basis of a signal from the vehicle speed sensor 7. The oil pressure of the continuously variable transmission is determined based on a signal from the oil pressure sensor 21. The closure of all doors and the bonnet is determined on the basis of a signal from the door courtesy switch 8.

When the range signal of the inhibitor switch 18 is in a non-running range, it is determined that idle stop conditions for the engine 1 are satisfied if all the conditions (11)–(15) above are satisfied, while the vehicle speed is zero and all the doors and the bonnet are closed.

When the idle stop conditions are satisfied in the step S6, the comprehensive controller 5 stops engine operation in a step S7. Specifically, the engine controller 3 outputs a signal to the engine controller 3 in order to stop generation and ignition of a gaseous mixture.

After the processing in the step S7, the comprehensive controller 5 terminates the routine. In the step S6, when it is determined that the idle stop conditions are not satisfied, the comprehensive controller 5 immediately terminates the routine.

In the step S6, even when the selected range is a non-running range, the engine 1 is stopped when a stop request is outputted. It is also possible to prevent the engine 1 from being stopped in a non-running range except for a case where the engine 1 was stopped in a running range and thereafter the shift lever was shifted to a non-running range. This invention can be applied to the idle stop control device of this type.

In the step S3, when it is determined that the start request of the engine 1 is not a start request from the driver, the comprehensive controller 5 verifies the identification code of the electronic key 12 in a step S5. An identification request is outputted to the identification controller 11 from the comprehensive controller 5 in order to perform the verification. The identification controller 11 verifies the identification code encoded in the identification signal outputted as a wireless signal by the electronic key 12. If the codes are found to correspond, a signal for positive identification is outputted to the comprehensive controller 5. When the identification signal is not inputted, or when the identification signal does not correspond to the internally-stored identification code, a signal for a negative identification result is outputted to the comprehensive controller 5.

In a step S8, the comprehensive controller 5 determines whether or not the verification of the electronic key by the identification controller 11 has been successful based on the above signal. Successful identification means that the driver is either inside or in the vicinity of the vehicle. When the verification operation is successful, the comprehensive controller 5 restarts the engine by performing the processing in the step S4.

When the verification is not successful, in a step S9, the comprehensive controller 5 determines whether or not a person is sitting in the driver's seat based on a signal from the seat switch 9. Even when the verification is not successful, the engine 1 is restarted by performing the processing in the step S4 when there is a person in the driver's seat.

In the step S9, when it is determined that there is not a person seated in the driver's seat, the comprehensive controller 5 does not start the engine 1. In a step S10, the relay switch 10 which supplies battery power to the engine accessories is switched to the OFF position. This process prevents a reduction in the SOC of the battery by suppressing power consumption by the battery. After the process in the step S10, the comprehensive controller 5 terminates the routine. When the routine is terminated after performing the processing in the step S10, the routine will not be performed on a subsequent occasion. When the engine 1 is restarted as a result of a startup operation performed by the driver, execution of the routine resumes.

Let us assume that there is a restart request corresponding to conditions (3)–(6) which are not performed by the driver and that the engine 1 is in an idle stop state as a result of the execution of an idle stop control routine. In this situation, as long as the verification of the identification code of the electronic key 12 is not successful, restarting of the engine 1 will not be allowed.

Thus it is possible to ensure that adverse effects resulting from engine restarting will be avoided when the driver is not present in the vehicle during an engine idle stop. The idle stop control routine described above has only one exception, however. Even when the verification of the identification code of the electronic key 12 is unsuccessful, when a person is seated in the driver's seat, restarting of the engine 1 is permitted. This corresponds to the situation in which a person other than the driver alights from the vehicle in possession of the electronic key 12.

Figure 3:
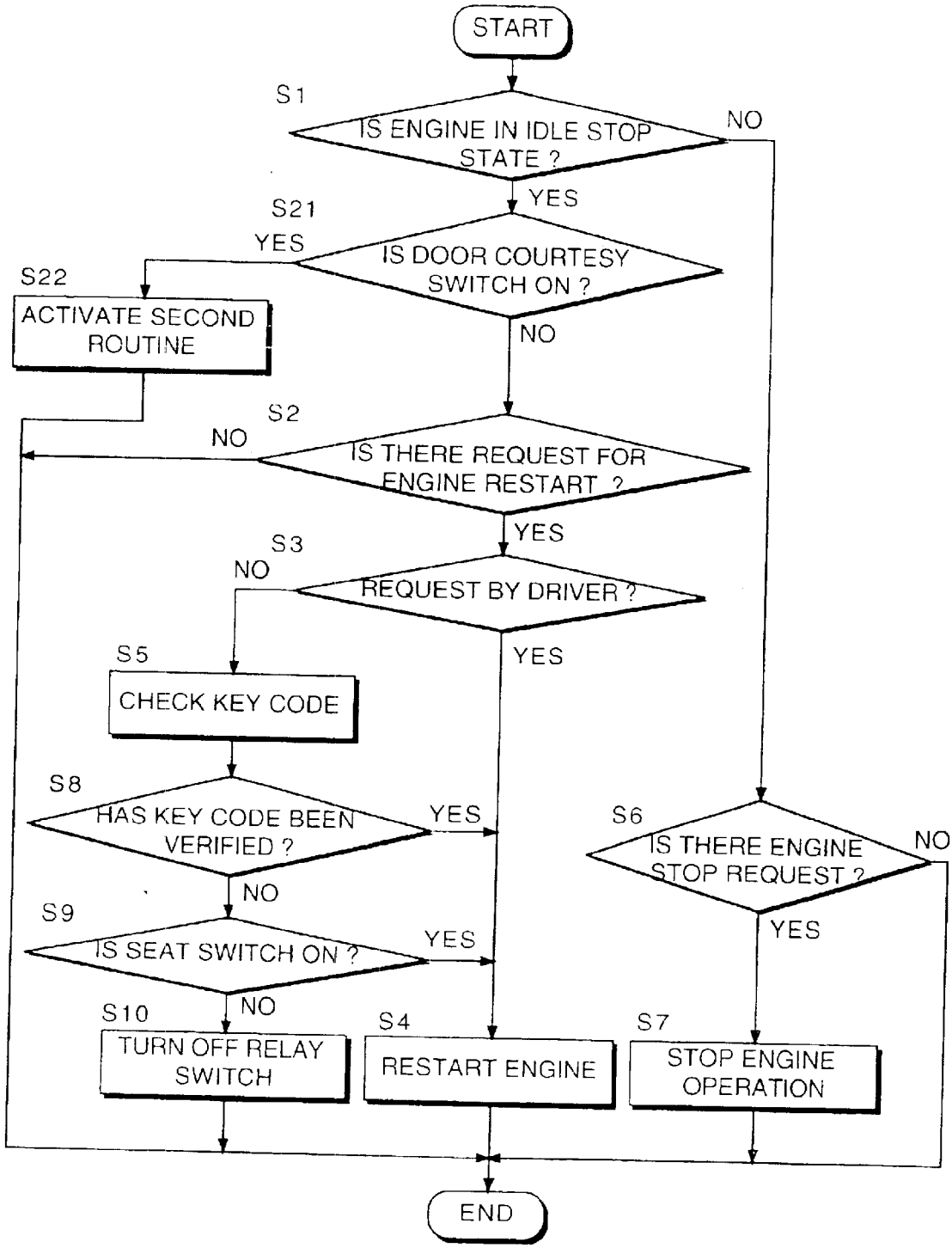
FIG. 3 is similar to FIG. 2 but showing a second embodiment of this invention.
Figure 4:
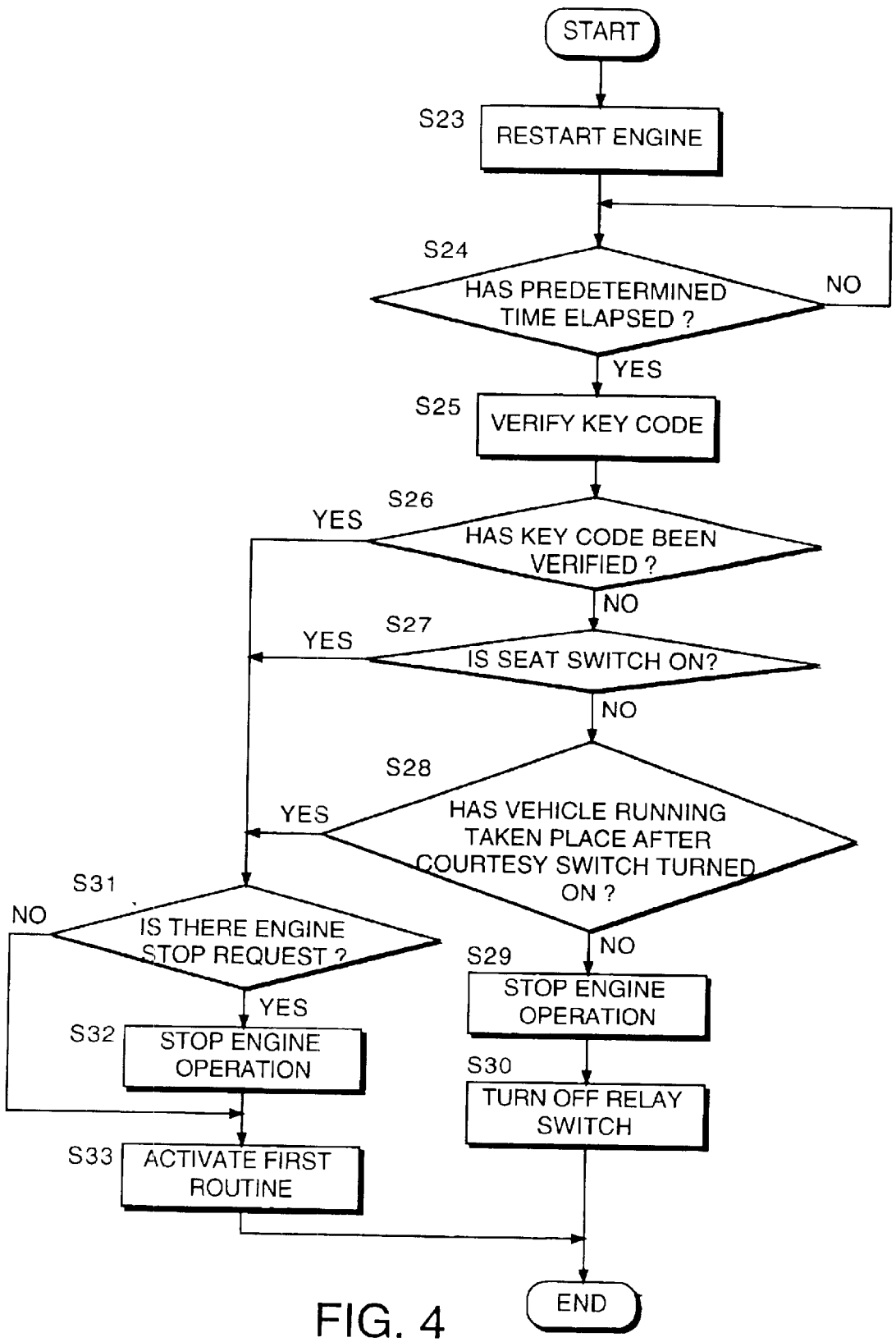
FIG. 4 is a flowchart showing a second routine for idle stop control executed by a comprehensive controller according to the second embodiment of this invention.

Referring to FIGS. 3 and 4, another embodiment of this invention will be described.

In this embodiment, when a signal from the door courtesy switch 8 is outputted while the engine 1 is in an idle stop state, in other words, when a door or the bonnet is open, restarting of the engine 1 is once permitted. When a predetermined time period elapses after the restart, verification of the identification code of the electronic key 12 is performed, and if there is a verifying failure, operation of the engine 1 is stopped. Consequently there is the possibility that the engine 1 will be restarted even when the driver has alighted from the vehicle. A verifying failure of the identification code of the electronic key 12 after a predetermined time period has elapsed after the restart means that there is a high probability that the driver is in the vicinity of the vehicle and thus is not aware of the restarting of the engine 1. In this situation therefore the operation of the engine 1 is stopped.

The hardware used in this embodiment is the same as that used in the first embodiment. However the comprehensive controller 5 executes the idle stop control routine shown in FIG. 3 instead of the routine in FIG. 2.

The routine is FIG. 3 comprises steps S21 and S22 added to the routine shown in FIG. 2.

The comprehensive controller 5 determines whether or not the door courtesy switch 8 is in the ON position in the step S21 when the engine 1 is in an idle stop state. When the door courtesy switch 8 is in the ON position, in other words, when a door or the bonnet is open, the comprehensive controller 5 performs a second routine in the step S22. As long as the second routine is executed, execution of the routine shown in FIG. 3 is suspended.

Referring to FIG. 4, the second routine executed when the door courtesy switch 8 is in the ON position will be described. This routine is only executed when the door courtesy switch 8 is in the ON position.

Firstly in the step S23, the comprehensive controller 5 restarts the engine 1. Then in a step S24, the comprehensive controller 5 determines whether or not a predetermined time period has elapsed after the restarting of the engine 1 and waits for the predetermined time period to elapse.

Thereafter in a step S25, the comprehensive controller 5 verifies the identification code of the electronic key 12. This is equivalent to the processing performed in the step S5.

In a step S26, the comprehensive controller 5 determines whether or not the verification operation of the identification code of the electronic key 12 was successful. When the verification of the identification code is successful, it means that the driver is at least in the vicinity of the vehicle. In this case, the comprehensive controller 5 performs the processing in a step S31.

When the verification of the identification code is not successful, the comprehensive controller 5 determines whether or not a person is seated in the driver's seat based on the signal from the seat switch 9 in a step S27. Even when the verification is unsuccessful, the comprehensive controller 5 performs the processing in the step S31 when there is a person seated in the driver's seat.

When the seat switch 9 is turned OFF, in other words, when there is not a person seated in the driver's seat, in a step 28, the comprehensive controller 5 determines whether or not the vehicle has experienced running after the door courtesy switch 8 is turned ON. When the vehicle has experienced running after the door courtesy switch 8 is turned ON, the comprehensive controller 5 performs the processing in the step S31. The determination is performed by determining whether or not a shift operation in the continuously variable transmission, a braking operation or an acceleration operation has been performed after the door courtesy switch 8 is turned ON. Alternatively it determines whether or not the vehicle speed has varied. When any of the above determination results are affirmative, it is determined that the vehicle has experienced running after the courtesy switch 8 is turned ON.

In the step S31, in the same manner as the step S6, the comprehensive controller 5 confirms whether idle stop conditions for the engine 1 have been established. When the idle stop conditions are satisfied, the comprehensive controller 5 stops the operation of the engine 1 in a step S32. Then in a step S33, after commanding the routine shown in FIG. 3 to restart, the routine is terminated. When the idle stop conditions are not satisfied, the comprehensive controller 5 terminates the routine after performing the processing in the step S33.

On the other hand, in the step S28 when running of the vehicle has not taken place after the courtesy switch 8 is placed in the ON position, the comprehensive controller 5 stops the operation of the engine 1 in the step S29. Then in a step S30, in the same manner as the processing in the step S10, the routine is terminated after putting the relay switch 10 in the OFF position. When the routine is terminated via performing the step S30, the routine shown in the FIG. 3 is not performed thereafter. The routine shown in the FIG. 3 is only performed again when the engine 1 is restarted by a startup operation performed by the driver.

According to this embodiment, the following effect is obtained in addition to the effect obtained in the first embodiment. Specifically, if a door is opened by the driver when alighting from the vehicle when the engine 1 is in an idle stop state, the engine 1 is restarted when the door courtesy switch 9 is turned on. When a predetermined time period has elapsed after the engine 1 is restarted, the identification code of the electronic key 12 is verified. When the verification operation is successful, it is determined that the driver is in the vicinity of the vehicle and aware of the restarting of the engine 1. In this case, the operation of the engine 1 continues. When the identification code verification on the electronic key 12 fails, the operation of the engine 1 is terminated. Thus the engine 1 does not operate during a long time period when the driver is not in the vicinity of the vehicle. This device allows for reductions in the fuel consumption of the engine 1.

Furthermore after the engine 1 is restarted in the step S23, even when the identification code verification on the electronic key 12 fails, if the driver is seated in the driver's seat or if there is a history of vehicle operation after restarting, the operation of the engine 1 is continued until idle stop conditions are satisfied. Consequently even when a person other than the driver leaves the vicinity of the vehicle with the electronic key 12, the vehicle is maintained in an operable state. It should be noted that this arrangement is effective only in restarting the engine 1 during idle stop. The electronic key system does not allow the vehicle to start running even when the engine 1 is operating unless otherwise the identification code of the electronic key 12 is verified.

The contents of Tokugan 2002-312410 with a filing date of Oct. 28, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A control device for an engine of a vehicle, the engine comprising an operating device which operates the engine under an electronic key system comprising a portable electronic key which emits an identification code, and an identification device mounted in the vehicle to verify the identification code of the electronic key, the control device comprising:

a programmable controller programmed to:
control the operating device to execute an idle stop which stops the engine under a predetermined stop condition;
control the operating device to restart the engine during the idle stop when any of a plurality of restart conditions are satisfied, the restart conditions including a restart request from a driver of the vehicle;
determine whether or not the engine is in the idle stop;
determine whether or not a restart condition is satisfied which does not correspond to a restart request from the driver during an idle stop;
control the identification device to verify the identification code of the electronic key when a restart condition is satisfied which does not correspond to the restart request from the driver during the idle stop; and
prohibit the operating device from restarting the engine when the identification device has failed in verifying the identification code.

2. The control device as defined in claim 1, wherein the vehicle comprises accessories, a battery which supplies electrical power to the electronic apparatuses, and a switch which cuts off the supply of electrical power from the battery to the accessories at an OFF position, and the controller is further programmed to place the switch in the OFF position when the identification device has failed in verifying the identification code.

3. The control device as defined in claim 1, wherein the vehicle comprises a driver's seat in which a driver is seated, and the control device further comprises a switch which detects whether or not the driver's seat is being used, and the controller is further programmed to allow the operating device to restart the engine when the driver's seat is occupied even when the identification device has failed in verifying the identification code.

4. The control device as defined in claim 1, wherein the vehicle comprises a door, and the control device further comprises a switch which responds to the opening or closing of the door, and the controller is further programmed to control the operating device to restart the engine when the door is open during the idle stop, control the identification device to verify the identification code of the electronic key when a predetermined time period has elapsed after the restart, and control the operating device to stop the operation of the engine when the identification device has failed in verifying the identification code.

5. The control device as defined in claim 4, wherein the vehicle comprises accessories, a battery which supplies electrical power to the accessories, and a switch which cuts off the supply of electrical power from the battery to the accessories at an OFF position, and the controller is further programmed to place the switch in the OFF position after stopping the operation of the engine when the identification device has failed in verifying the identification code after the restart of the engine.

6. The control device as defined in claim 4, wherein the controller is further programmed to determine whether or not the vehicle has a history of running after restarting of the engine, and to control the operating device not to stop the operation of the engine if the vehicle has a history of running after restarting the engine even when the identification device has failed in verifying the identification code.

7. The control device as defined in claim 6, wherein the controller is further programmed to control the operating device to stop the operation of the engine when a predetermined stop condition is satisfied even when the vehicle has a history of running after restarting the engine.

8. The control device as defined in claim 4, wherein the vehicle comprises a driver's seat in which a driver is seated, and the control device further comprises a switch which detects whether or not the driver's seat is being used, and the controller is further programmed to control the operating device not to stop the operation of the engine when the driver's seat is being used even when the identification device has failed in verifying the identification code.

9. The control device as defined in claim 7, wherein the controller is further programmed to control the operating device to stop the operation of the engine when a predetermined stop condition is satisfied even when the driver's seat is being used.

10. The control device as defined in claim 4, wherein the controller is further programmed to control the operating device to stop the operation of the engine when a predetermined stop condition is satisfied when the identification device has successfully verified the identification code.

11. A control device for an engine of a vehicle, the engine comprising an operating device which operates the engine under an electronic key system comprising a portable electronic key which emits an identification code, and an identification device mounted in the vehicle to verify the identification code of the electronic key, the control device comprising:

means for controlling the operating device to execute an idle stop which stops the engine under a predetermined stop condition;

means for controlling the operating device to restart the engine during the idle stop when any of a plurality of restart conditions are satisfied, the restart conditions including a restart request from a driver of the vehicle;

means for determining whether or not the engine is in the idle stop;

means for determining whether or not a restart condition is satisfied which does not correspond to a restart request from the driver during an idle stop;

means for controlling the identification device to verify the identification code of the electronic key when a restart condition is satisfied which does not correspond to the restart request from the driver during the idle stop; and means for prohibiting the operating device from restarting the engine when the identification device has failed in verifying the identification code.

12. A control method for an engine of a vehicle, the engine comprising an operating device which operates the engine under an electronic key system comprising a portable electronic key which emits an identification code, and an identification device mounted in the vehicle to verify the identification code of the electronic key, the control method comprising:

controlling the operating device to execute an idle stop which stops the engine under a predetermined stop condition;

controlling the operating device to restart the engine during the idle stop when any of a plurality of restart conditions are satisfied, the restart conditions including a restart request from a driver of the vehicle;

determining whether or not the engine is in the idle stop;

determining whether or not a restart condition is satisfied which does not correspond to a restart request from the driver during an idle stop;

controlling the identification device to verify the identification code of the electronic key when a restart condition is satisfied which does not correspond to the restart request from the driver during the idle stop; and prohibiting the operating device from restarting the engine when the identification device has failed in verifying the identification code.

* * * * *